US008814670B2

(12) United States Patent
Koo

(10) Patent No.: US 8,814,670 B2
(45) Date of Patent: Aug. 26, 2014

(54) SYSTEM AND METHOD FOR PLAYING A MULTIPLAYER GAME

(75) Inventor: Chang Hoh Koo, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 82 days.

(21) Appl. No.: 12/855,539

(22) Filed: Aug. 12, 2010

(65) Prior Publication Data

US 2012/0040752 A1 Feb. 16, 2012

(51) Int. Cl.
*A63F 13/00* (2014.01)

(52) U.S. Cl.
USPC ........................................................ 463/29

(58) Field of Classification Search
USPC .............................................. 463/29, 23, 9
See application file for complete search history.

(56) References Cited

U.S. PATENT DOCUMENTS

| | | | | |
|---|---|---|---|---|
| 2002/0198045 | A1* | 12/2002 | Okubo | 463/29 |
| 2006/0116189 | A1* | 6/2006 | Tessmer et al. | 463/16 |
| 2006/0121971 | A1* | 6/2006 | Slomiany et al. | 463/16 |
| 2008/0274796 | A1* | 11/2008 | Lube | 463/25 |
| 2008/0311980 | A1* | 12/2008 | Cannon | 463/25 |
| 2009/0011827 | A1* | 1/2009 | Englman et al. | 463/27 |
| 2009/0280891 | A1* | 11/2009 | Filipour et al. | 463/22 |
| 2010/0113162 | A1* | 5/2010 | Vemuri et al. | 463/42 |
| 2010/0227679 | A1* | 9/2010 | Konishi et al. | 463/29 |

* cited by examiner

*Primary Examiner* — Damon Pierce
*Assistant Examiner* — Allen Chan
(74) *Attorney, Agent, or Firm* — Patterson & Sheridan, LLP

(57) ABSTRACT

A system and method for playing a multiplayer game are disclosed. In one embodiment, the method includes, queuing a player for a multiplayer game, determining that at least one criterion for beginning the multiplayer game has not been met, beginning a queuing game for the queued player, and determining that the criterion has been met. In response to determining that the criterion has been met, the method continues by ending the queuing game for the player, determining a queuing game outcome for the player, and beginning the multiplayer game, wherein the multiplayer game is based, at least in part, on the queuing game outcome.

24 Claims, 5 Drawing Sheets

SYSTEM AND METHOD FOR PLAYING A MULTIPLAYER GAME

BACKGROUND

Field

This application relates to systems and methods for playing a multiplayer game, and in particular, to providing a queuing game to a user waiting to join a multiplayer game.

SUMMARY

The systems and methods of the development each have several aspects, no single one of which is solely responsible for its desirable attributes. Without limiting the scope of this disclosure as expressed by presented claims, its more prominent features will now be discussed briefly. After considering this discussion, and particularly after reading the section entitled "Detailed Description" one will understand how the sample features of this development provide advantages that including providing a queuing game to user waiting to join a multiplayer game.

One aspect is a method for providing a queuing game, the method comprising queuing a player for a multiplayer game, determining that at least one criterion for beginning the multiplayer game has not been met, beginning a queuing game for the queued player, determining that the criterion has been met, and, in response to determining that the criterion has been met, ending the queuing game for the player, determining a queuing game outcome for the player, and beginning the multiplayer game, wherein the multiplayer game is based, at least in part, on the queuing game outcome.

Another aspect is a system for providing a queuing game, the system comprising a processor configured to queue a player for a multiplayer game, determine that at least one criterion for beginning the multiplayer game has not been met, begin a queuing game for the queued player, determine that the criterion has been met, and, in response to determining that the criterion has been met, end the queuing game for the player, determine a queuing game outcome for the player, and begin the multiplayer game, wherein the multiplayer game is based, at least in part, on the queuing game outcome. The system also comprises an interface configured to receive user input and output results based on the user input.

Another aspect is a system for providing a queuing game, the method comprising means for queuing a player for a multiplayer game, means for determining that at least one criterion for beginning the multiplayer game has not been met, means for beginning a queuing game for the queued player, means for determining that the criterion has been met, means for, in response to the determination that the criterion has been met, ending the queuing game for the player, means for, in response to the determination that the criterion has been met, determining a queuing game outcome for the player, and means for, in response to the determination that the criterion has been met, beginning the multiplayer game, wherein the multiplayer game is based, at least in part, on the queuing game outcome.

Another aspect is a computer-readable medium having instructions encoded thereon which, when executed by a computer, cause the computer to perform a method of providing a queuing game, the method comprising queuing a player for a multiplayer game, determining that at least one criterion for beginning the multiplayer game has not been met, beginning a queuing game for the queued player, determining that the criterion has been met, and, in response to determining that the criterion has been met, ending the queuing game for the player, determining a queuing game outcome for the player, and beginning the multiplayer game, wherein the multiplayer game is based, at least in part, on the queuing game outcome.

DETAILED DESCRIPTION

The following detailed description is directed to certain specific aspects of the development. However, the development can be embodied in a multitude of different ways, for example, as defined and covered by any presented claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may performed by one or more computer processors configured to execute instructions retrieved from a computer-readable storage medium. A computer-readable storage medium stores information, such as data or instructions, for some interval of time, such that the information can be read by a computer during that interval of time. Examples of computer-readable storage media are memory, such as random access memory (RAM), and storage, such as hard drives, optical discs, flash memory, floppy disks, magnetic tape, paper tape, punch cards, and Zip drives.

Figure 1:
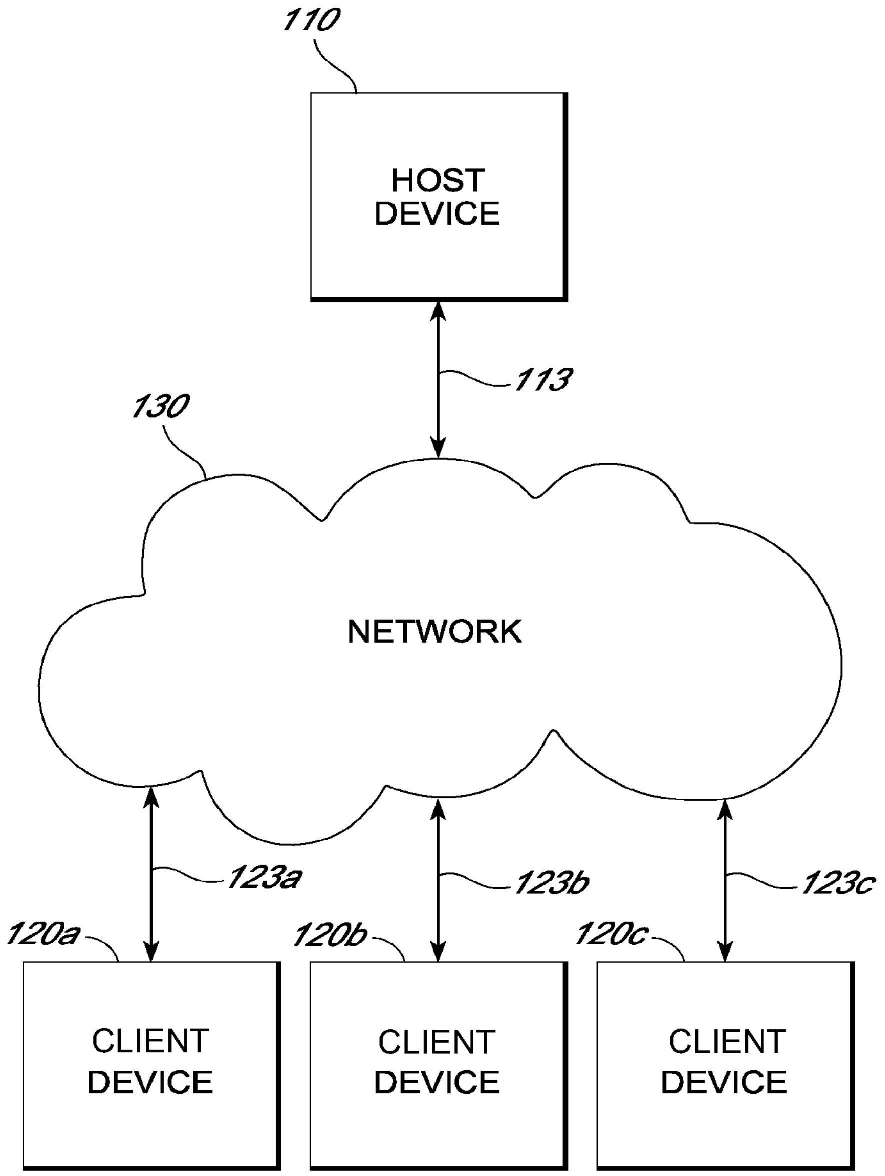
FIG. 1 is a functional block diagram of a network for playing a multiplayer game.

FIG. 1 is a functional block diagram of a network for playing a multiplayer game. The system 100 includes a host device 110 and a number of client devices 120*a*, 120*b*, 120*c* connected to a network 130. The host device 110 is in data communication with the network 130 via a host communication link 113 and each of the client devices 120*a*, 120*b*, 120*c* is in data communication with the network 130 via a client communication link 123*a*, 123*b*, 123*c*. Thus, the host device 110 is in data communication with the client devices 120*a*, 120*b*, 120*c* via the network 130. Similarly, the client devices 120*a*, 120*b*, 120*c* are in data communication with each other via the network 130. The communication links 113, 123*a*, 123*b*, 123*c* can be wired or wireless links.

In one embodiment, the host device 110 is a game server that receives requests to join a multiplayer game from the client device 120*a*, 120*b*, 120*c*, which are, for example, personal computers or gaming consoles. During play of the multiplayer game, the host device 110 receives gaming commands from the client devices 120*a*, 120*b*, 120*c*, processes the information based on gaming software stored at the host device 110, and transmits gaming results to the client devices 120*a*, 120*b*, 120*c*. In another embodiment, a multiplayer game is played by users of the gaming devices 120*a*, 120*b*, 120*c* without the need for a dedicated game server or host device 110.

Figure 2:
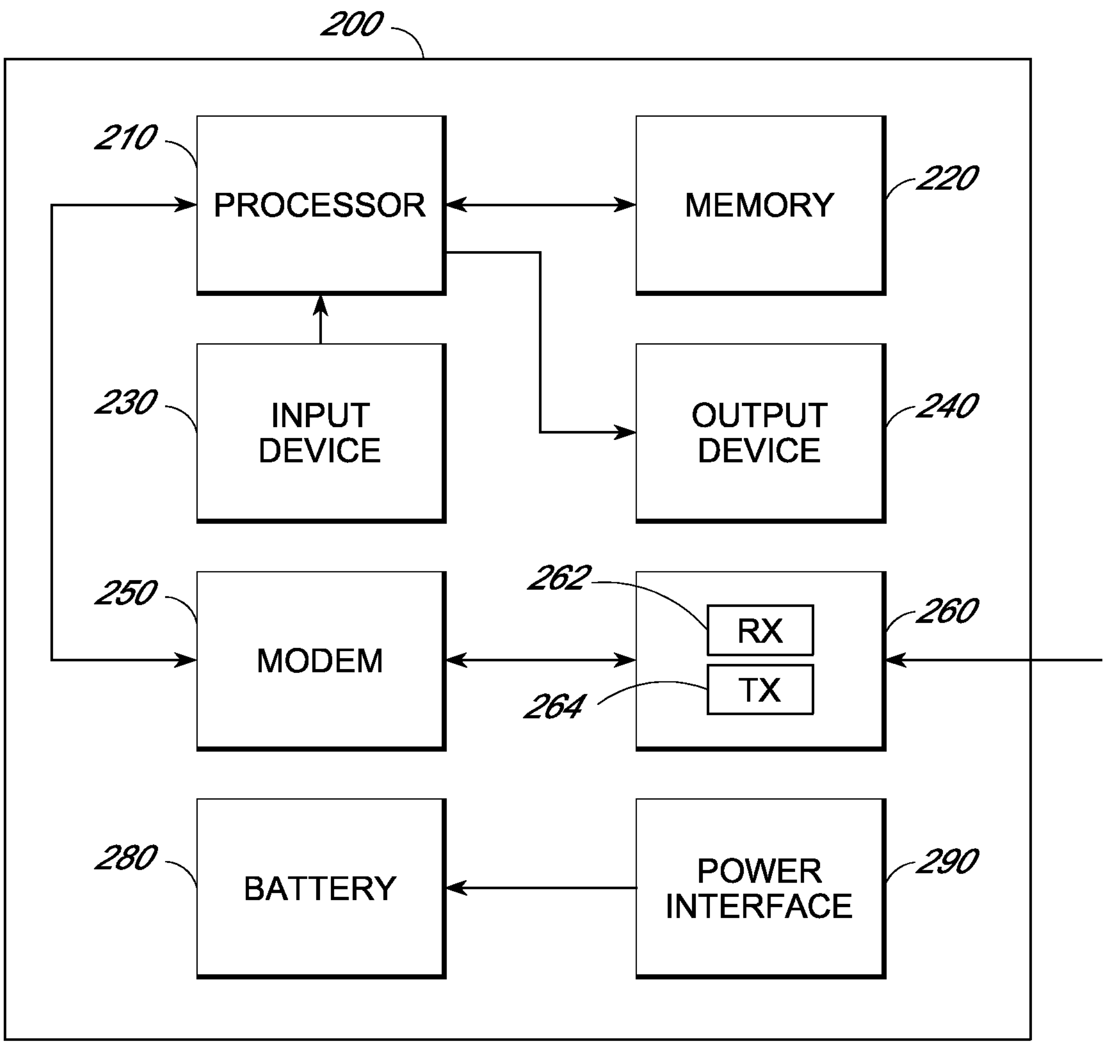
FIG. 2 is a functional block diagram of a user device that can perform the functions of a host device or a client device.

FIG. 2 is a functional block diagram of a user device 200 that can perform the functions of a host device or a client device. The user device 200 includes a processor 210 in data communication with a memory 220, an input device 230, and an output device 240. The processor is further in data communication with a modem 250 and a transceiver 260. The transceiver 260 is also in data communication with the modem 250 and a network (not shown). The user device 200 and components thereof are powered by a battery 280 and/or an external power source. In some embodiments, the battery 280, or a portion thereof, is rechargeable by an external power source via a power interface 290. Although described separately, it is to be appreciated that functional blocks described with respect to the user device 200 need not be separate structural elements. For example, the processor 210 and memory 220 may be embodied in a single chip. Similarly, two or more of the processor 210, modem 250, and transceiver 260 may be embodied in a single chip. Additionally, the input device 230 and output device 240 may be a single structure, such as a touch screen display.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the user device 200. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, a microphone (possibly coupled to audio processing software to, e.g., detect voice commands), or an accelerometer. Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a modem 250 and a transceiver 260. Together, the modem and transceiver form a network interface. The modem 250 and transceiver 260 prepare data generated by the processor 210 for wireless transmission over the network according to one or more network communication standards. The modem 250 and transceiver 260 also demodulate data received over the network according to one or more network communication standards. The transceiver can include a transmitter 262, a receiver 264, or both. In other embodiments, the transmitter and receiver are two separate components. The modem 250 and transceiver 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

The user device 200 and components thereof are powered by a battery 280 and/or an external power source. The battery 280 can be any device that stores energy, and particularly any device which stores chemical energy and provides it as electrical energy. The battery 280 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some embodiments, the battery 280, or a portion thereof, is rechargeable by an external power source via a power interface 290. The power interface 290 can include a jack for connecting a battery charger, an inductor for near field wireless energy transfer, or a photovoltaic panel for converting solar energy into electrical energy.

In some embodiments, the user device 200 is a personal computer, a game console, a mobile telephone, a personal data assistant (PDAs), a GPS receiver/navigator, a camera, an MP3 player, a camcorder, a wrist watch, a clock, or a television.

As mentioned above, the system 100 of FIG. 1, can be used to player a multiplayer game. In some embodiments, a user wishing to join a multiplayer game can login, using a client device, to a host device, indicating this desire. However, a multiplayer game cannot be started without multiple such users.

Figure 3:
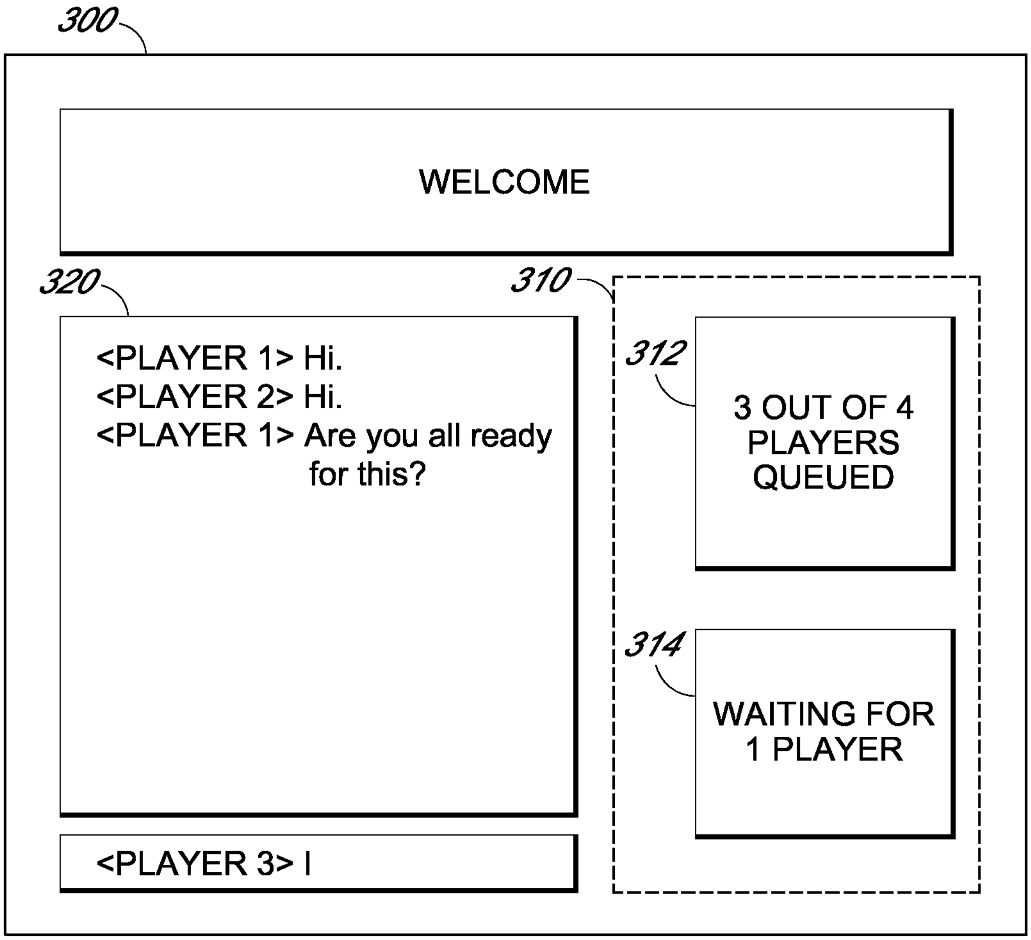
FIG. 3 is an exemplary screenshot of a staging screen.

FIG. 3 is an exemplary screenshot of a staging screen. The staging screen may also be referred to as a lobby. When a user logs in to a host device (or configures a client device to act as a host device), the user is presented with a staging screen. The staging screen 300 can include an indication area 310 which indicates the number of users waiting to join a multiplayer game 312 and/or criteria for starting the multiplayer game which have not been met 314. The staging screen 300 can also include an interaction area 320 allowing users to chat while waiting for the multiplayer game to begin.

Users waiting for the criteria for stating the multiplayer game to be met may become bored or disengaged from the game, particularly as the wait time increases. By adding a queuing game to the staging screen, or accessible from the staging screen, users are able to continue interacting with the system while waiting to begin a multiplayer game. In one embodiment, the queuing game is single-player game, whereas in another embodiment, the queuing game is also a multiplayer game, playable between multiple users awaiting criteria for starting the awaited multiplayer game to be met.

The queuing game can engage users in active participation, thereby reducing disengagement and boredom. In one embodiment, to further engage users, the queuing game results in a queuing game outcome which affects the awaited multiplayer game. For example, the user with the highest queuing game score could be selected to choose an option for the multiplayer game when it is to begin. As another example, each user may be awarded a variable advantage (health, credits, preferable starting location) based on his or her queuing game score.

Figure 4:
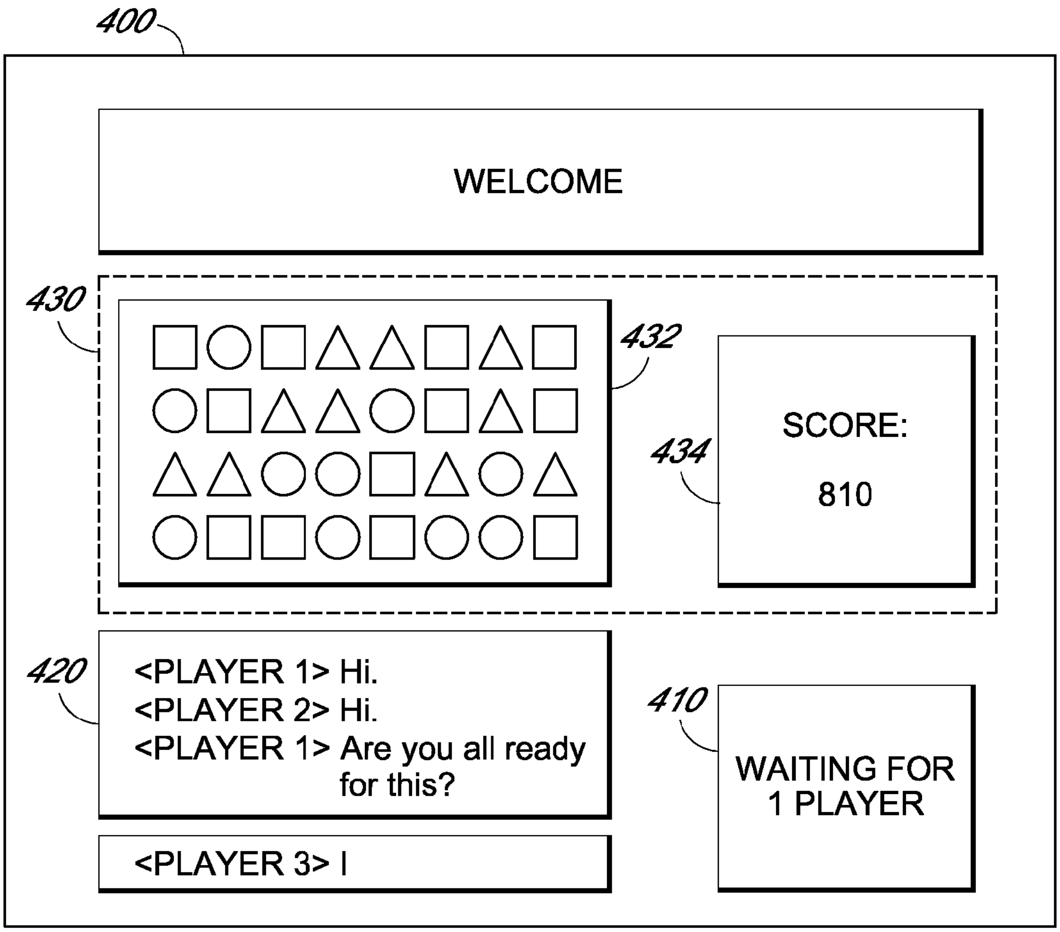
FIG. 4 is an exemplary screenshot of a staging screen including a queuing game.

FIG. 4 is an exemplary screenshot of a staging screen including a queuing game. The staging screen 400 can include an indication area 410 which indicates criteria for starting the multiplayer game which have not been met and an interaction area 420 allowing users to chat while waiting for the multiplayer game to begin.

The staging screen 400 also includes a queuing game area 430 in which a queuing game is presented to the user. The queuing game area 430 can include an active gaming area 432 where the user inputs gaming commands and a passive gaming area 434 which indicates, for example, a queuing game score. In FIG. 4, the queuing game presented is a match-3 type game; however, other queuing games can be used.

Figure 5:
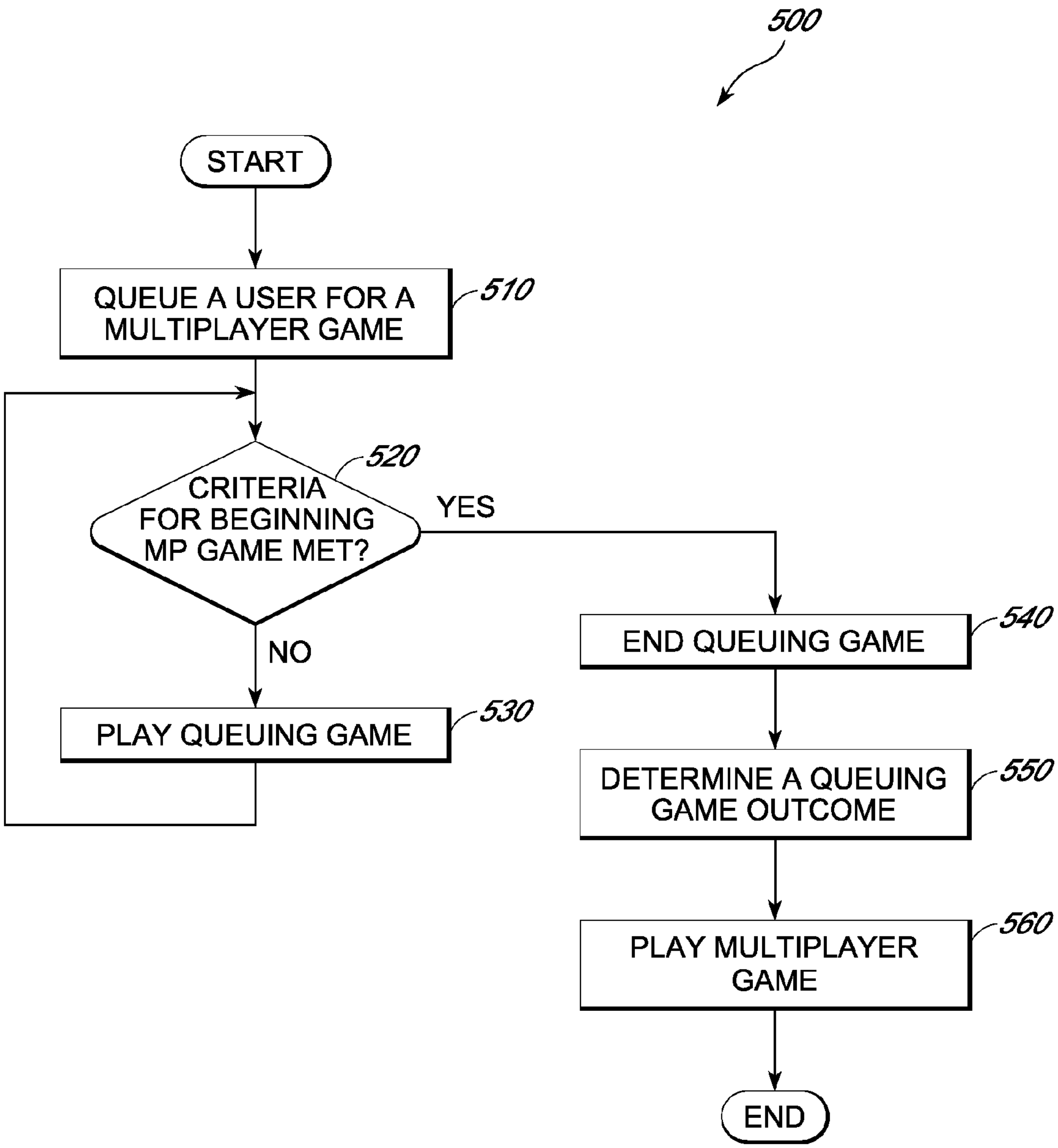
FIG. 5 is a flowchart illustrating a method of playing a multiplayer game.

FIG. 5 is a flowchart illustrating a method of playing a multiplayer game. The method 500 begins, in block 510, by queuing a user for a multiplayer game. The queuing can be performed, for example, by the host device 110 of FIG. 1, in response to receiving a request to play a multiplayer game from the user via the network 120.

In one embodiment, the host device, exemplified by user device 200 of FIG. 2, receives the request at a processor 210, via a receiver 262, and configures a memory 220 to indicate that a particular user has requested to play a multiplayer game. The processor 210 can store a user identifier, such as a username or an IP address, in a list-based data structure in the memory 220.

Next, in block 520, it is determined whether the criteria for beginning the multiplayer game have been met. The determination can be performed, for example, by the processor 210 of FIG. 2. One or more criteria for beginning the multiplayer game can be determined. In one embodiment, the criteria includes a criterion that a predetermined number of users are queued for the multiplayer game. For example, if a multiplayer game requires four players, and only three users have been queued, it is determined that the criterion has not been met.

In one embodiment, the criteria includes a criterion that a predetermined time has elapsed. For example, if any player has been queued for more than ten minutes, it can determined that the criterion has been met. The described criteria can be combined in any number of ways, including determining that at least one of a plurality of criteria are met or all of a plurality of criteria are met. For example, it can be determined that the criteria are met if either four players are queued or any player has been queued for more than ten minutes.

In one embodiment, the criteria includes a criterion that another multiplayer game has concluded. For example, if a host device can only host a predetermined number of multiplayer games due to limited resources, the criterion may only be met when less than the predetermined number of multiplayer games are in session. This criterion may also be used in a tournament mode. For example, in a single-elimination tournament, a first and second player may be matched in a first semi-final round and a third and fourth player may be matched in a second semi-final round. When the first semi-final round is completed, the winner of the match is queued for final round until the second semi-final round is completed. During this time, the winner can be presented with queuing game, as described below, until the criterion is met that the other multiplayer game (the second semi-final round) has concluded.

If it is determined that the criteria for beginning the multiplayer game are not met, the method 500 continues to block 530 where a queuing game is presented. The queuing game can be begun, and further presented, by host device 110 of FIG. 1. In one embodiment, the host device, exemplified by user device 200 of FIG. 2, initializes the queuing game using the processor 210 in conjunction with the memory 210, receives user input for the queuing game over the network via the receiver 262, and transmits game results over the network via the transmitter 264.

Any number of games can be utilized for the queuing game. In one embodiment, the queuing game is a puzzle game, such as a match-3 style game or a hidden picture game. In another embodiment, the queuing game is a shooting gallery game, which may utilize a portion of the game software for the multiplayer game. In particular, the queuing game may be related to the multiplayer game. For example, the queuing game can be a sparring match where the multiplayer game is a fighting game. As another example, the queuing game can be a penalty kick simulation wherein the multiplayer game is a soccer game. In another embodiment, the queuing game is a card game, such as solitaire or Hearts. The queuing game can be a multiplayer game played by a single player against computer-controlled opponents.

In one embodiment, the queuing game is characterized by relatively simple gameplay. For example, the queuing game may only allow user input to include a cursor location and a button-click input.

In one embodiment, the queuing game is characterized by frequent scoring events, such that when the multiplayer game begins, the interruption of the queuing game (in block 540, described below) does not disadvantage the player. In one embodiment, scoring events can occur at a rate of greater than once a minute, greater than five times a minute, or greater than ten times a minute.

In one embodiment, the queuing game is characterized by a continuously changing score, like a timer. For example, the queuing game may require a user to move an avatar to avoid objects and the score is the time elapsed from the beginning of the queuing game to when the avatar touches an object.

While the queuing game is in progress, the method 500 continually or periodically cycles through blocks 520 and 530 to determine whether the criteria for beginning the multiplayer game have been met. During the time, an indication of the criteria not yet met is displayed to the user as part of the queuing game or on a separate portion of the screen.

If it is determined that the criteria for beginning the multiplayer game have been met, the method 500 continues to block 540 where the queuing game is ended. Ending the queuing game can be performed, for example, by the processor 210 of FIG. 2. In one embodiment, ending the queuing game includes transmitting a notification that the queuing game has ended.

The method 500 continues to block 550 where a queuing game outcome is determined. The queuing game outcome can be determined, for example, by the processor 210 of FIG. 2. In one embodiment, the queuing game outcome is a numerical score obtained by the player of the queuing game. In another embodiment, the queuing game outcome is a determination of the queuing game player with the highest score. In one embodiment, the queuing game outcome is randomly determined based on, for example, the number of queued users playing the queuing game, queuing game score, or other characteristics. In one embodiment, the queuing game outcome is an accuracy of a shooting game. In a particular embodiment, the queuing game outcome is nonnumeric.

Next, in block 560, the multiplayer game is presented to and played by the queued users. The multiplayer game can be presented by, for example, the host device 110 of FIG. 1. In one embodiment, the host device, exemplified by user device 200 of FIG. 2, initializes the multiplayer game using the processor 210 in conjunction with the memory 210, receives user input from multiple users for the multiplayer game over the network via the receiver 262, and transmits game results over the network via the transmitter 264.

In one embodiment, the multiplayer game is based, at least in part, on the queuing game outcome. For example, if the queuing game outcome is a queuing score, the queuing game player can be awarded a variable advantage (health, credits, preferable starting location) at the beginning of the multiplayer based on the queuing game score. As another example, if the queuing game outcome is a determination of the player with the highest queuing game score, the multiplayer player game can be based on a selection received from that player. For example, the user can select a map or a rule set to be used in the multiplayer game.

In another embodiment, teams of the multiplayer game are assigned based on the queuing game outcome. For example, if the queuing game is a shooting gallery game and the queuing game outcome for each player is an accuracy, teams may be balanced by assigning an approximately equal number of high accuracy and low accuracy players on each team.

Once the multiplayer game has completed for a particular player, the method can end or return to block 510 by queuing the particular player for a next multiplayer game.

In one embodiment, the method 500 repeats for a number of multiplayer games based one respective queuing game outcomes for each of one or more players. In a current iteration of the method 500, the multiplayer game is based, at least in part, on the prior multiplayer games. For example, if a particular map for a multiplayer game is relatively unused as compared to other maps, the queuing game can include that particular map as part of treasure hunt style game. In this example, use of the particular map could give queuing game players familiarity with the map and lead to greater usage of that map in the multiplayer game.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

I claim:

1. A method for providing a queuing game, the method comprising:

queuing a first player for a multiplayer game, wherein the multiplayer game provides a virtual environment in which players in a first plurality of players interact with one another, and wherein a second plurality of players, inclusive of the first player, are queued for the multiplayer game;

upon determining that a plurality of criteria for beginning the multiplayer game have not been satisfied, beginning, by operation of one or more computer processors, a queuing game for the queued first player, wherein upon determining that a first level of the multiplayer game is less played, relative to other levels of the multiplayer game, selecting the first level for use in the queuing game for the queued first player, based at least in part on the queuing game having a predefined association with the first level of the multiplayer game;

in response to determining that at least a first criterion of the plurality of criteria has been satisfied, while the first player is playing the queuing game, ending the queuing game for the first player; and beginning the multiplayer game for at least the first player.

2. The method of claim 1, wherein the at least one criterion comprises a criterion that at least a predetermined number of players are queued for the multiplayer game.

3. The method of claim 1, wherein the first criterion is satisfied with respect to a player other than the first player in the second plurality of players.

4. The method of claim 1, the method comprising, after beginning the queuing game and before ending the queuing game, outputting an indication of the unmet criterion.

5. The method of claim 1, wherein the method is repeated at the end of a first multiplayer game to begin a second multiplayer game.

6. The method of claim 1, wherein the queuing game comprises a treasure hunt game played on a map associated with the first level of the multiplayer game.

7. A system for providing a queuing game, the system comprising:

a processor; and a memory containing a program that, when executed by the processor, performs an operation to:

queue a first player for a multiplayer game, wherein the multiplayer game provides a virtual environment in which players in a first plurality of players interact with one another, and wherein a second plurality of players, inclusive of the first player, are queued for the multiplayer game;

upon determining that a plurality of criteria for beginning the multiplayer game have not been satisfied, begin a queuing game for the queued first player, wherein upon determining that a first level of the multiplayer game is less played, relative to other levels of the multiplayer game, selecting the first level for use in the queuing game for the queued first player, based at least in part on the queuing game having a predefined association with the first level of the multiplayer game;

in response to determining that at least a first criterion of the plurality of criteria has been satisfied, while the first player is playing the queuing game, end the queuing game for the first player;

begin the multiplayer game for at least the first player.

8. The system of claim 7, wherein the system comprises at least one input device and at least one output device.

9. The system of claim 7, wherein the system comprises a network interface configured to receive and transmit digital signals.

10. The system of claim 7, wherein the program, when executed by the processor, further performs an operation to:

determine a queuing game outcome for the first player, based on a state of the queuing game when the queuing game ended, wherein the queuing game outcome comprises a numerical queuing game score, wherein the interface is configured to receive a selection for the player with the highest queuing game outcome, and wherein the multiplayer game is based on the selection; and begin the multiplayer game for at least the first player, wherein an individual gameplay perk for the first player in the multiplayer game is affected based on the determined queuing game outcome, wherein the affected individual gameplay perk provides a variable advantage in the multiplayer game for the first player, relative to other players in the plurality of players of the multiplayer game.

11. The system of claim 7, wherein the program, when executed by the processor, further performs an operation to:

determine a queuing game outcome for the first player, based on a state of the queuing game when the queuing game ended;

begin the multiplayer game for at least the first player, wherein an individual gameplay perk for the first player in the multiplayer game is affected based on the determined queuing game outcome, wherein the affected individual gameplay perk provides a variable advantage in the multiplayer game for the first player, relative to other players in the plurality of players of the multiplayer game monitoring a plurality of prior multiplayer games based on prior queuing game outcomes, wherein the player is assigned to one of the two or more teams based, at least in part, on the prior multiplayer games.

12. The system of claim 7, wherein the queuing game comprises a treasure hunt game played on a map associated with the first level of the multiplayer game.

13. A non-transitory computer-readable medium having instructions encoded thereon which, when executed by a computer, cause the computer to perform a method of providing a queuing game, the method comprising:

queuing a first player for a multiplayer game, wherein the multiplayer game provides a virtual environment in which players in a first plurality of players interact with one another, and wherein a second plurality of players, inclusive of the first player, are queued for the multiplayer game;

upon determining that a plurality of criteria for beginning the multiplayer game have not been satisfied, beginning a queuing game for the queued first player, wherein upon determining that a first level of the multiplayer game is less played, relative to other levels of the multiplayer game, selecting the first level for use in the queuing game for the queued first player, based at least in part on the queuing game having a predefined association with the first level of the multiplayer game;

in response to determining that at least a first criterion of the plurality of criteria has been satisfied, while the first player is playing the queuing game, ending the queuing game for the first player;

beginning the multiplayer game for at least the first player.

14. The non-transitory computer-readable medium of claim 13, wherein the queuing game comprises a treasure hunt game played on a map associated with the first level of the multiplayer game.

15. A computer-implemented method for providing a queuing game, the method comprising:

queuing a first player for a computer-implemented multiplayer game, wherein the multiplayer game provides a virtual environment in which players in a first plurality of players interact with one another, and wherein a second plurality of players, inclusive of the first player, are queued for the multiplayer game;

upon determining that a plurality of criteria for beginning the multiplayer game have not been satisfied, beginning, by operation of one or more computer processors, a computer-implemented queuing game for the queued first player, wherein a first criterion of the plurality of criteria comprises a predetermined period of time having elapsed since an earliest one of the second plurality of players was queued for the multiplayer game, and wherein upon determining that a first level of the multiplayer game is less played, relative to other levels of the multiplayer game, selecting the first level for use in the queuing game for the queued first player, based at least in part on the queuing game having a predefined association with the first level of the multiplayer game;

in response to determining that at least the first criterion of the plurality of criteria has been satisfied, while the first player is playing the queuing game, ending the queuing game for the first player;

determining that a queuing game outcome for the first player, based on a state of the queuing game when the queuing game ended;

beginning the multiplayer game for at least the first player, wherein an individual gameplay perk for the first player in the multiplayer game is affected based on the determined queuing game outcome, wherein the affected individual gameplay perk provides a variable advantage in the multiplayer game for the first player, relative to other players in the plurality of players of the multiplayer game.

16. The method of claim 15, wherein determining a queuing game outcome comprises determining an elapsed time.

17. The method of claim 15, wherein determining a queuing game outcome comprises determining a numerical queuing game score and wherein the multiplayer game is based on a selection received from the player with the highest queuing game score.

18. The method of claim 15, the method further comprising:

monitoring a plurality of prior multiplayer games based on prior queuing game outcomes, wherein the player is assigned to one of the two or more teams based, at least in part, on the prior multiplayer games.

19. The method of claim 15, further comprising:

determining two or more teams for the plurality of players to the multiplayer game, wherein the first player is assigned to one of the two or more teams based at least in part on the queuing game outcome, such that the first player is assigned lower-scoring teammates upon having a higher score from the queuing game, and such that the first player is assigned higher scoring teammates upon having a lower score from the queuing game, and wherein beginning the multiplayer game is further based on the determined two or more teams.

20. The method of claim 15, further comprising:

determining a highest scoring player for the queuing game, selected from the plurality of players to the multiplayer game; and receiving a selection of a gameplay parameter from the highest scoring player, wherein a gameplay aspect of the multiplayer game is affected for all of the plurality of players to the multiplayer game further based on the selected gameplay parameter.

21. The method of claim 20, wherein the selection of the gameplay parameter includes at least one of a map selection and a rule set selection for the multiplayer game, such that all of the plurality of players to the multiplayer game play the multiplayer game using the at least one of the map selection and the rule set selection for the multiplayer game.

22. The method of claim 15, wherein the multiplayer game is hosted on a server device, wherein each of the plurality of players accesses the multiplayer game on the server device using a respective client device, wherein the queuing game is played locally on a client device associated with the first player, and wherein the individual gameplay perk for the first player in the multiplayer game is depicted on the respective client device for the first player.

23. The method of claim 15, wherein the individual gameplay perk comprises at least one of a health bonus, an in-game credit bonus and a preferable starting location within the multiplayer game.

24. The method of claim 15, wherein the queuing game comprises a treasure hunt game played on a map associated with the first level of the multiplayer game.

* * * * *